(12) United States Patent
Janson et al.

(10) Patent No.: US 7,821,801 B2
(45) Date of Patent: Oct. 26, 2010

(54) POWER FACTOR CORRECTION METHOD FOR AC/DC CONVERTERS AND CORRESPONDING CONVERTER

(75) Inventors: Kuno Janson, Tallinn (EE); Jaan Jarvik, Tallinn (EE); Jevgeni Shklovski, Tallinn (EE)

(73) Assignee: Tallinn University of Technology, Tallinn (EE)

( * ) Notice: Subject to any disclaimer, the term of this patent is extended or adjusted under 35 U.S.C. 154(b) by 463 days.

(21) Appl. No.: 11/721,706

(22) PCT Filed: Dec. 13, 2005

(86) PCT No.: PCT/EE2005/000010

§ 371 (c)(1),
(2), (4) Date: Jun. 14, 2007

(87) PCT Pub. No.: WO2006/063598

PCT Pub. Date: Jun. 22, 2006

(65) Prior Publication Data

US 2009/0146619 A1    Jun. 11, 2009

(30) Foreign Application Priority Data

Dec. 14, 2004  (EE) ............................. 200400124

(51) Int. Cl.
*H02M 7/06* (2006.01)
(52) U.S. Cl. ..................... 363/126; 363/21.02; 323/208
(58) Field of Classification Search .................. 323/208; 363/126, 21.02, 124–125, 127, 89
See application file for complete search history.

(56) References Cited

U.S. PATENT DOCUMENTS

| 5,081,570 | A | 1/1992 | Chibani et al. |
| 5,132,606 | A | 7/1992 | Herbert |
| 5,375,053 | A | 12/1994 | Jarvik et al. |
| 5,444,608 | A * | 8/1995 | Jain et al. ..................... 363/17 |
| 5,731,969 | A | 3/1998 | Small |
| 6,262,897 | B1 * | 7/2001 | Yasumura ................ 363/21.02 |
| 2004/0136208 | A1 * | 7/2004 | Agarwal et al. .......... 363/21.12 |

OTHER PUBLICATIONS

Prasad, A.R. et al., "Passive Input Current Waveshaping Method for Three-Phase Diode Rectifiers", IEEE Proceedings-B, Nov. 1992, pp. 512-520, vol. 139, No. 6.
Janson, K. et al., "AC-DC Converter with Parametric Reactive Power Compensation", IEEE Trans. Power Electron, Jun. 1999, pp. 554-562, vol. 46.

(Continued)

*Primary Examiner*—Harry Behm
(74) *Attorney, Agent, or Firm*—Vern Maine & Associates

(57) ABSTRACT

An indirect and passive method for AC/DC converter power factor correction is disclosed. The correction is achieved by stabilizing the input impedance of the converter with keeping the inversely proportional dependence between the current $i_{conv}(t)$ and voltage $u_{conv}(t)$ of the output smoothing filter (3). The necessary dependence is achieved by natural characteristics of circuit with passive components. An uncontrolled converter (6) with alternation of parallel and series resonance is used as such circuit. To increase the operating frequency of this converter, a chopper or an inverter is used. The resonant converter decreases the commutation current of the switches. Output voltage is easy to control by pulse width modulation of chopper or inverter. Passive power factor correction results in the total harmonic distortion of main current $THD_i=10$ to 40 per cent. All currents of the converter are limited naturally in all operating modes.

15 Claims, 12 Drawing Sheets

OTHER PUBLICATIONS

Mohan, N. et al., "Power Electronics", John Wiley & Sons, Inc., 1995, pp. 488-494, New York.

Singer, S., "Power Conversion and Control with Zero AC Current Harmonics by Means of a Time-Variable Transformer", IEEE Proceedings, Aug. 1984, pp. 147-150, vol. 131, PT. G, No. 4.

PCT Search Report dated Jan. 31, 2006 for PCT Application No. PCT/EE2005/000010 filed Dec. 13, 2005.

Janson, K. et al., "Load Adapting Frequency Resonant Converters for Supplying Electrical Arc—a New Way in Power Electronics", IEEE, 1998, pp. 2090-2096.

* cited by examiner

POWER FACTOR CORRECTION METHOD FOR AC/DC CONVERTERS AND CORRESPONDING CONVERTER

RELATED APPLICATIONS

This application is a national phase application of PCT Application Ser. No. PCT/EE2005/000010 filed Dec. 13, 2005, which, in turn, claims priority to Estonian Application No. P200400124, filed Dec. 14, 2004. Each of these applications is herein incorporated in its entirety by reference.

TECHNICAL FIELD

The present invention relates to the power electronics and can be used in AC/DC converters to reduce distortion of AC side current and thus, to improve the power factor of the converters. The invention is particularly useful in converters with frequent short circuit operating, e.g., in power supplies for electric arcs.

BACKGROUND ART

There are known passive power factor correction methods that use a network frequency LC resonance circuits operating as a higher frequency harmonic filter. For instance, a higher harmonics filter is connected in series with a bridge rectifier on its AC side (A. R. Prasad, P. D. Ziogas, S. Manias. Passive input current waveshaping method for three-phase diode rectifiers. IEE Proceedings-B, Vol. 139, No. 6, November 1992, pp. 512-520). There is also known a converter with parallel and series resonance alternation (K. Janson, J. Järvik. AC-DC Converter with Parametric Reactive Power Compensation. IEEE Trans. Power Electron, Vol. 46, June 1999, pp. 554-562) where coil and capacitor, through diodes of the rectifier bridge, are forming a parallel or series resonance circuit of network frequency. Both resonance circuits are reducing the higher harmonics in mains current. The advantage of passive power factor correction methods is in their simplicity, but their disadvantage at network frequencies (50/60 Hz) is too large weight, size and cost.

There are also known active power factor correction methods, which use a converter to shape mains current; these converters are operating at the higher frequencies compared to the network voltage frequency and they contain controlled electronic switches (N. Mohan, T. Undeland, W. Robbins. Power electronics. Wiley, N.Y., 1995, pp. 488-494). The reference curve corresponding to RMS value of the converter mains current and similar to the waveform of mains voltage is obtained in the control circuit of the device for mains current shaping. The mains current shaping device is controlled on the basis of measured differences between instantaneous values of the reference and real mains current; there is a boost converter for that purpose. The advantage of the method is a reduced weight and size of coils and capacitors in switch-mode converters because of the higher switching frequency. The disadvantage of the method is that, for power factor correction, an additional converter must be used, which usually cannot be simultaneously used for regulation of the rectified voltage. Another disadvantage is a complicated control circuit that has to include both voltage and current sensors is required.

There are also known indirect active power factor correction methods, which are the most close to present invention and where the shape of mains current is not shaped directly, but the input impedance of the converter is kept constant using controlled modulators. (E. Herbert. Method and apparatus for controlling the input impedance of a power converter. U.S. Pat. No. 5,132,606). In case of constant input impedance the mains current of the converter automatically becomes similar to mains voltage in shape and no distortion occurs in the current waveform. This is an advantage of the method. The disadvantage in implementation of the described method is in a large number of electronic switches of the modulator and complicated control. Input impedance could, in principle, kept constant using matching transformer having fast-changing turns ratio in time domain. (S. Singer. Power conversion and control with zero AC current harmonics by means of a time-variable transformer. IEE Proceedings, Vol. 131, Pt. G, No. 4, August 1984, pp. 147-150). The implementation of such transformer using passive components is not known and drawback of the implementation using active components is in its complexity.

The input impedance of AC/DC converters changes during every half-cycle of mains voltage due to switching processes in the converter. Therefore, the shape of the mains current instantaneous values is distorted and differs significantly from the shape of instantaneous values of mains voltage, resulting also in decreased power factor.

The distortion of current shape distorts the quality of mains voltage. Hereby, additional losses appear both in equipment of mains as in many consumers' devices supplied from the mains. Moreover, ageing of the insulation is speeding up both in grid and in consumer devices.

The goal of the invention is a simple method and simple means for correcting the power factor, reducing the costs of correcting the power factor, and increasing reliability.

DISCLOSURE OF THE INVENTION

To achieve this goal of the invention, indirect and passive correction methods at higher frequencies are used which enable to reduce the size and weight of the coils and capacitors while no control circuit is required. The method of passive correction is realized by rectifying the alternating mains voltage and converting the obtained unsmoothed unidirectional mains voltage half-waves into high-frequency voltage by means of switching elements. This high-frequency voltage is delivered to the power factor correction circuit having stabilizing input impedance. To stabilize input impedance, the instantaneous value of the current supplying to the input of DC smoothing filter is keeping inversely proportional to the instantaneous value of input voltage of the same DC smoothing filter. The natural characteristics of the correction circuit with passive elements are used to keep the inverse proportion between output voltage and current and thus, power factor correction is passively achieved. In the absence of correction circuit, the input impedance of AC/DC converter is changing every half-cycle of mains voltage. If converter has a smoothing filter with capacitor, so the variations of instantaneous value of the voltage on capacitor are small and they differ significantly from the alternation of instantaneous value of the mains voltage. This causes changing of the input impedance. If it is case of smoothing filter with a choke, the variation of current instantaneous value through the choke is small and differs significantly from alternation of instantaneous value of sinusoidal mains current. It also causes changing of the input impedance. The input impedance becomes constant by means of transformer, inserted between mains and smoothing filter and having fast-changing ratio, which is to eliminate voltage or current differences. To play the role of such transformer, a converter circuit connected between mains and smoothing filter, with the following parameters could be used:

1. The input reactance of the converter circuit is constant and consequently the instantaneous power consumed from the mains is directly proportional to mains voltage squared.
2. The instantaneous values of current and voltage supplied from converter circuit to smoothing filter are inversely proportional and therefore, the instantaneous power delivered to the smoothing filter is not depending on the voltage in case of smoothing filter with capacitor or on the current in case of smoothing filter with choke.

For example, if it is capacitor at the input of smoothing filter, and capacitor voltage is 2 times less compared to mains voltage at whatever instant of time, then because of inverse proportion, the input current of smoothing filter increases 2 times compared to the mains current, and thus instantaneous power is not changing. The independence of instantaneous power from voltage on capacitor or current through choke of the smoothing filter enables to consume power from mains proportionally to the instantaneous value of mains voltage squared. And this means stabilization of the input impedance that is the purpose of the present invention.

The advantage of the method for current shaping described above is in a fact that there is no measurement of the current or voltage instantaneous values needed. It is only necessary to provide the required ratio between mains voltage and instantaneous power as well as between instantaneous values of voltage and current in smoothing filter. Keeping the required ratios with reasonable accuracy is possible by implementing a converter with parallel and series resonance alternation. The converter with parallel and series resonance alternation has an inversely proportional dependence between output voltage and current. But this is valid only if the rate of changes of the current or voltage in output circuit is less by 1 to 2 orders compared to mains frequency. As inversely proportional dependence on the converter output is needed for frequency not lower, but higher than mains frequency, so the converter must have a higher frequency power supply. To increase the frequency, a frequency-increasing unit is connected ahead of the converter with parallel and series resonance alternation. The frequency increment also gives one more good effect—elimination of the main drawback of the converter with parallel and series resonance alternation that is a large weight and size of converter's transformer, coil and capacitor.

At high frequency, converter with parallel and series resonance alternation is not functioning more as a higher harmonics filter in mains current like it was at mains frequency. The useful effect is produced here as a result of using of the inversely proportional dependence between output voltage and current of the converter. The frequency-increasing unit having converter with parallel and series resonance alternation is connected between rectifier bridge and smoothing filter for rectified voltage. The supply voltage of the frequency-increasing unit is not a constant DC voltage, as it is common, but there are unsmoothed half-waves of mains voltage, which are pulsating from zero to amplitude value of mains voltage. The frequency-increasing unit could be implemented as a single chopper or inverter. Chopper is preferred at small powers, as it contains only one power transistor and it is very simple. At larger powers, an inverter is more practical, as it is possible to load converter with more power compared to chopper. The output voltage of the chopper or inverter is a square wave with modulated amplitude.

The output power of the converter with parallel and series resonance alternation at nominal operating point is proportional to input voltage squared. The power of this nominal operating point is changing according to the square of instantaneous value of the mains voltage. At a first approach, this power is independent from capacitor voltage of the smoothing filter connected to the converter output. Nevertheless, the range of constant output power independent of the voltage for uncontrolled converter with parallel and series resonance alternation is relatively narrow and in the range of small instantaneous values of mains voltage there is distortion in the current shape. Therefore, mains current distortion ($THD_i$), in case of single-phase rectifier and described above passive correction, is from 10 to 40 per cent. It is possible to reduce distortion factor if in addition to passive methods an active ones are implemented. For this purpose capacitive branch of the converter with parallel and series resonance alternation is provided with adjustable current by-pass circuit which extends the range of constant power of the converter. The by-pass circuit conducts the current of capacitive branch past the rectifier bridge during these periods of time while instantaneous value of mains voltage is lower than voltage on capacitor of the smoothing filter and diodes of the bridge rectifier are in off state.

If it is needed to control the output power of AC/DC converter, so it is possible to achieve by using pulse width modulation for chopper or inverter. Under such control, the shape of mains current is not changing significantly.

To implement such AC/DC converter, there is required a rectifier bridge having inputs supplied with mains alternating voltage, the DC voltage smoothing filter having output for load supplying and the power factor correction device connected between the output of the rectifier bridge and input of the smoothing filter. This power factor correction device is formed by the frequency-increasing unit and converter with parallel and series resonance alternation connected in series. This converter comprises a transformer having primary winding and at least two serially connected secondary windings and a coil connected to one of the secondary windings in series and a capacitor connected to another one also in series, and three-phase bridge rectifier having input terminal connections as follows: first input connected to coil, second to common connection terminal of secondary windings and third input to capacitor. The nearly constant power is obtained on the output of such kind device. This means if we increase load current by decreasing load resistance, the voltage is decreasing inversely proportionally to the current. It is useful in some cases, for example, by supplying of electric arc. But usually it is needed to keep voltage constant regardless the current changing in the load. The output voltage of this converter can be stabilized and also controlled, if a feedback circuit, which decreases relative duration of the voltage pulses in chopper or inverter in case of the output voltage increasing, is used. The use of such feedback circuit does not change significantly the shape of the mains current.

If it is needed to supply many galvanically separated and different voltage loads, so it is possible to provide transformer of the converter with parallel and series resonance alternation with additional secondary winding pairs and bridge rectifiers connected further. This way, it is possible to stabilize the voltage of one load by means of frequency-increasing unit and feedback circuit.

The converter based on the described method also provides additional advantages.

As the converter with parallel and series resonance alternation also includes transformer, then along with power factor correction, the galvanic separation from mains and required voltage level are obtained. This way, the overall simplicity of the solution is achieved.

Secondly, by occasional short-circuit on the output of AC/DC converter the output current is not increasing more than 1.6 to 1.8 times of the rated current. And currents in all circuit elements are approximately at the level of rated current. The limitation of the output current during short-circuit originates from the converter with parallel and series resonance alternation, which is automatically switching to the parallel circuit mode. If usually, a short-circuit protection for DC side of AC/DC converters is necessary, so in this case, it is generally not needed.

Third advantage is a fact that instead of alternating voltage the converter with parallel and series resonance alternation could be supplied with unidirectional DC voltage pulses, which could be obtained. by means of one-transistor switch (chopper). Hereby, in transformer windings appears alternating voltage because of the capacitor recharging process in LC-circuit of the converter. In this way, a magnetic flux in the transformer is not permanently unidirectional, as it is in well-known one-transistor flyback or forward converters that enable to reduce size of the transformer.

Fourth advantage is a fact that the switching currents and losses in chopper or inverter connected ahead of the converter are reduced because of the using of the converter with parallel and series resonance alternation.

BRIEF DESCRIPTION OF THE DRAWINGS

The method for power factor correction in AC/DC converters and technicality of the converter based on this method are described according to drawings, where.

MODES FOR CARRYING OUT THE INVENTION

Figure 1:
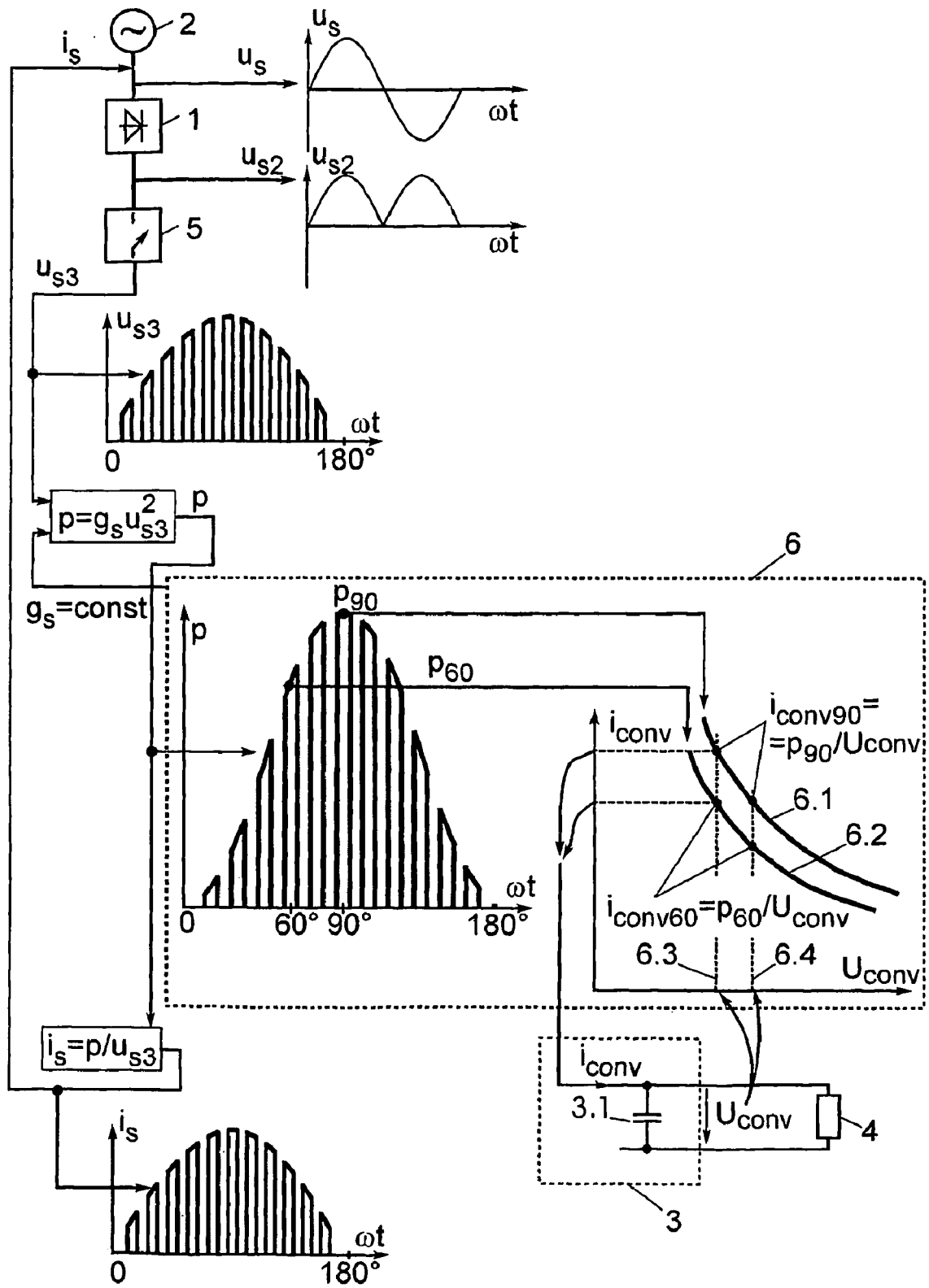
FIG. 1 depicts a general diagram of the indirect method for mains current shaping similar to mains voltage shape.

In the FIG. 1, there is shown generalized method for power factor correction in AC/DC converters. Alternating voltage $u_s$ supplied from the mains 2 is delivered then to rectifier 1. After rectifying an unsmoothed half-waves of the mains voltage $u_{s2}$ are obtained. The rectified and smoothed voltage is delivered from smoothing filter 3 to load 4. To improve the power factor, the rectified voltage is not delivered directly to the smoothing filter 3. At first, the shape of the voltage $u_{s2}$ is changed by means of chopper 5. Hereby, DC voltage pulse train $u_{s3}$ appears wherein amplitude of the pulses is changing according to the instantaneous value of mains voltage. This pulse train is delivered to the converter circuit 6, which is able to change voltage-current relation analogously to transformer. The input admittance $g_s$ of this converter circuit is constant and it consumes instantaneous power p from the mains, which could be defined by multiplication of the input admittance $g_s$ and voltage $u_{s3}$ squared $$p = g_s \cdot u_{s3}^2.$$

The smoothing filter 3 with capacitor input is connected with output of converter circuit 6. The converter circuit 6 supplies current to smoothing filter $i_{conv}$ and value of this current is defined by dividing of instantaneous mains power p by voltage of the smoothing filter $u_{conv}$ $$i_{conv} = p/U_{conv}.$$

The value of the current delivered to the smoothing filter is forming automatically, since converter circuit is constructed so that there is an inversely proportional dependence between output voltage $U_{conv}$ and current $i_{conv}$. In case if input voltage $u_{s3}$ in the converter circuit is not changing it gives a constant power, which is defined as $$p = U_{conv} \cdot i_{conv} = const,$$

and independent of the voltage on capacitor 3.1 in the smoothing filter 3. In case of varying input voltage $u_{s3}$, the instantaneous power p depends only on instantaneous value of input voltage $u_{s3}$ (if losses are not taken into consideration). In the FIG. 1 there are shown curves 6.1 and 6.2 of inversely proportional dependence between voltage $U_{conv}$ and current $i_{conv}$ for instantaneous powers $p_{60}$ and $p_{90}$ which are corresponding to the 60 and 90 electrical degrees of the angular frequency ωt. The output current $i_{conv}$ of the converter circuit 6 depends as on the instantaneous power p, so on the voltage of capacitor 3.1 in smoothing filter 3. The forming of the value of the output current is illustrated in the FIG. 1 by two vertical lines 6.3 and 6.4, which are corresponded to two different voltages $U_{conv}$ on capacitor 3.1. The value of current $i_{conv}$ delivered to the smoothing filter 3 is defined by points of intersection of the exponential curves 6.1 and 6.2, characterizing the inversely proportional dependence between voltage and current, with vertical lines 6.3 and 6.4.

If, in every time instant the instantaneous power p taken from the mains is proportional to square of mains voltage $u_s$ and delivered to the smoothing filter 3 regardless of the smoothing filter's voltage, so the shape of mains current $i_s(t)$ is automatically similar to shape of mains voltage. The shaping of the current waveform in time domain is mathematically described by relation $$i_s(t) = p(t)/u_s(t) = g_s[u_s(t)]^2/u_s(t) = g_s u_s(t),$$

where
$i_s(t)$—mains current varying in time; p(t)—power varying in time;
$u_s(t)$—mains voltage varying in time;
$g_s$—proportionality constant, which is to characterize an equivalent admittance.

Figure 2:
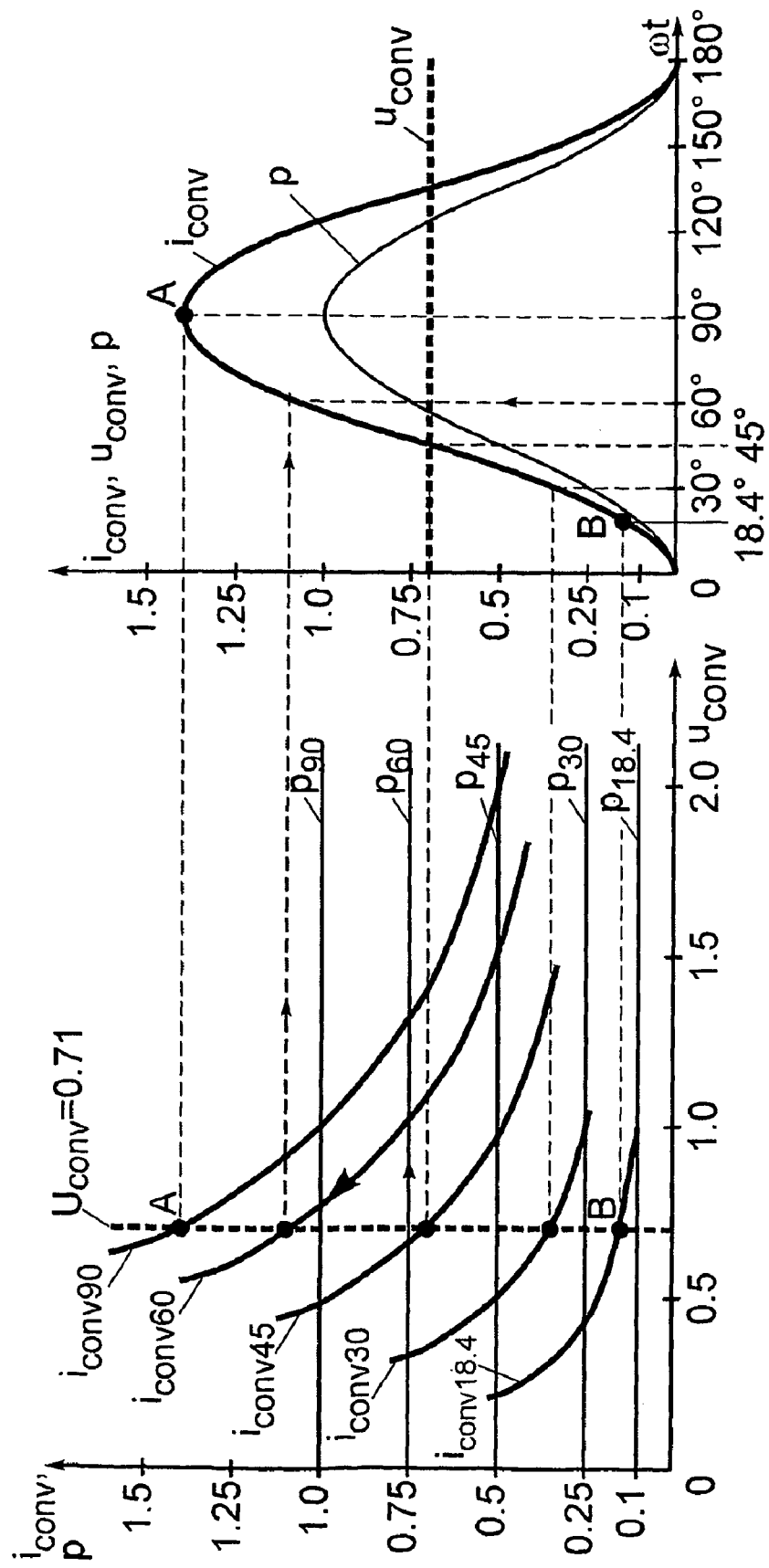
FIG. 2 depicts a graphical representation of instantaneous power supplied from mains to the smoothing filter regardless of voltage of the smoothing filter.

In the FIG. 2, there is shown in details how instantaneous power p from the mains is delivered to the smoothing filter at different time instants. In the left part of the FIG. 2 there are shown curves $i_{conv90}$ to $i_{conv18.4}$ of inversely proportional dependence between voltage $u_{conv}$ and input current $i_{conv}$ of the smoothing filter and also there are horizontal straight lines $p_{90}$ to $p_{18.4}$ of instantaneous power supplied from the mains. The index numbers shows here the instants of time corresponding to electrical degrees.

The voltage of the smoothing filter in FIG. 2 is chosen 0.71 relative units and vertical dashed-line describes this voltage. The instantaneous values of the current delivered to smoothing filter $i_{conv}$ corresponding to the time instants of 18.4 to 90 electrical degrees are defined by intersection points of current curves $i_{conv18.4}$ to $i_{conv90}$ go with straight line $u_{conv}$=0.71 corresponding to the smoothing filter voltage. For example, at time instant of 90 electrical degrees this intersection point is A and at time instant of 18.4 electrical degrees the intersection point is B.

In the right part of the FIG. 2 there is shown curve of the current delivered to smoothing filter $i_{conv}$ in time domain and there are also shown above mentioned points A and B on this curve. Determination of point of the input current of the smoothing filter $i_{conv}$ corresponding to the time instant of 60 electrical degrees is shown by arrows. In the right part of the FIG. 2 there are also shown voltage of the smoothing filter $u_{conv}$ (horizontal dashed-line) and curve of the power p delivered to the smoothing filter. The power curve is defined here by multiplication of smoothing filter voltage $u_{conv}$ and current $i_{conv}$ ($p=u_{conv} \cdot i_{conv}$).

Using described method for power factor correction increases varying of the load 4 voltage as an effect of the load current, this could be a drawback of the method. Namely, the constant power is delivered to the load 4 and, in accordance with correction method approach, it is not depending on the value of the load circuit resistance.

If load resistance increasing, the load current is decreasing, but voltage is increasing and, this way, power remains the same. By open-circuit or break at the output, voltage becomes theoretically infinitely large and by short-circuit current becomes theoretically infinitely large. In case of method practical implementation this extreme rise of the voltage and current is limited that is causing some degradation of the power factor.

Figure 3:
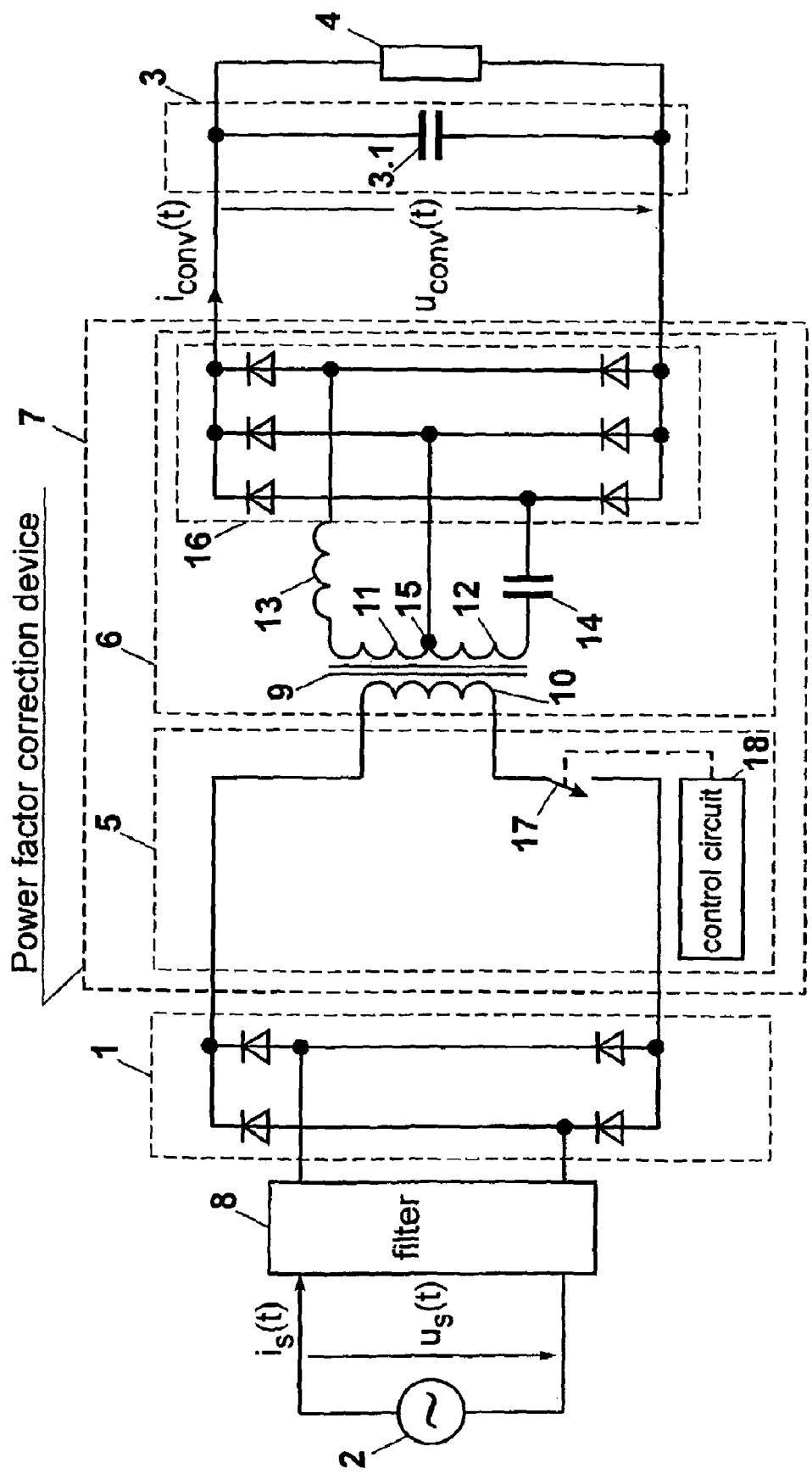
FIG. 3 depicts an electric circuit of AC/DC converter.

The AC/DC converter shown in the FIG. 3 contains a rectifier bridge (1) supplied with alternating voltage from the mains (2). The rectified voltage smoothing filter (3) is connected to the load (4). Frequency-increasing unit (5) and converter with parallel and series resonance alternation (6) are connected in series and forming a power factor correction device (7). The power factor correction device (7) is connected between rectifier bridge (1) and smoothing filter (3). The high-frequency filter is connected between bridge rectifier (1) and mains (2).

Converter with parallel and series resonance alternation (6) comprises the transformer (9) with primary winding (10) connected to frequency-increasing unit (5). Transformer (9) has two secondary windings (11 and 12). The secondary winding (11) and coil (13) are connected in series and secondary winding (12) and capacitor (14) are connected in series too.

The coil (13), common connection terminal (15) of secondary windings (11, 12) and capacitor (14) are connected to the inputs of rectifier bridge (16). There is smoothing filter (3) on the output of rectifier bridge (16). The secondary winding (11) and coil (13) are forming an inductive phase-shifting circuit in the converter with parallel and series resonance alternation and secondary winding (12) and capacitor (14) form a capacitive phase-shifting circuit in the same converter with parallel and series resonance alternation. Leakage inductance of secondary windings (11, 12), inductance of the coil (13) and capacitance of the capacitor (14) are chosen so that summarized reactances of inductive and capacitive branches are approximately equal at the operating frequency of the converter. Selection of the transformer's (9) ratio defines the no-load voltage of the converter with parallel and series resonance alternation. Transformer 9 provides also galvanic separation of the load 4 from the mains 2. There is a switching element 17 used in frequency-increasing unit 5, which is controlled by control circuit 18.

The AC/DC converter shown in the FIG. 3 is operating in the following way: voltage $u_s(t)$ is supplied from the mains 2 to rectifier bridge 1 through the filter 8. Filter 8 decreases high-frequency component in the mains current $i_s(t)$. There are unidirectional unsmoothed half-waves of the mains voltage appears on the output of the rectifier bridge 1. The switching element 17 in frequency-increasing unit 5 transforms these half-waves to the unidirectional pulse train. The amplitude of this pulse train is varying in time from amplitude value of mains voltage to zero.

The pulse train is supplied then to primary winding 10 of the transformer 9 which is a part of the converter with parallel and series resonance alternation 6. The converter with parallel and series resonance alternation 6 is operating in the mode where its output voltage on the capacitor 3.1 of the smoothing filter 3 is constant, but the input voltage of this converter 6 is permanently varying with instantaneous value of mains voltage. Because of the change of the converter's 6 input voltage, also its no-load voltage and maximal power which it can supply at corresponding voltage are changed. This is characterized in FIG. 4. In the right part of the FIG. 4, there are curves pconv of the output power of the converter 6 represented as a function of voltage uconv of the smoothing filter capacitor 3. For every instantaneous value of power of the mains voltage there is its own output power curve.

Figure 4:
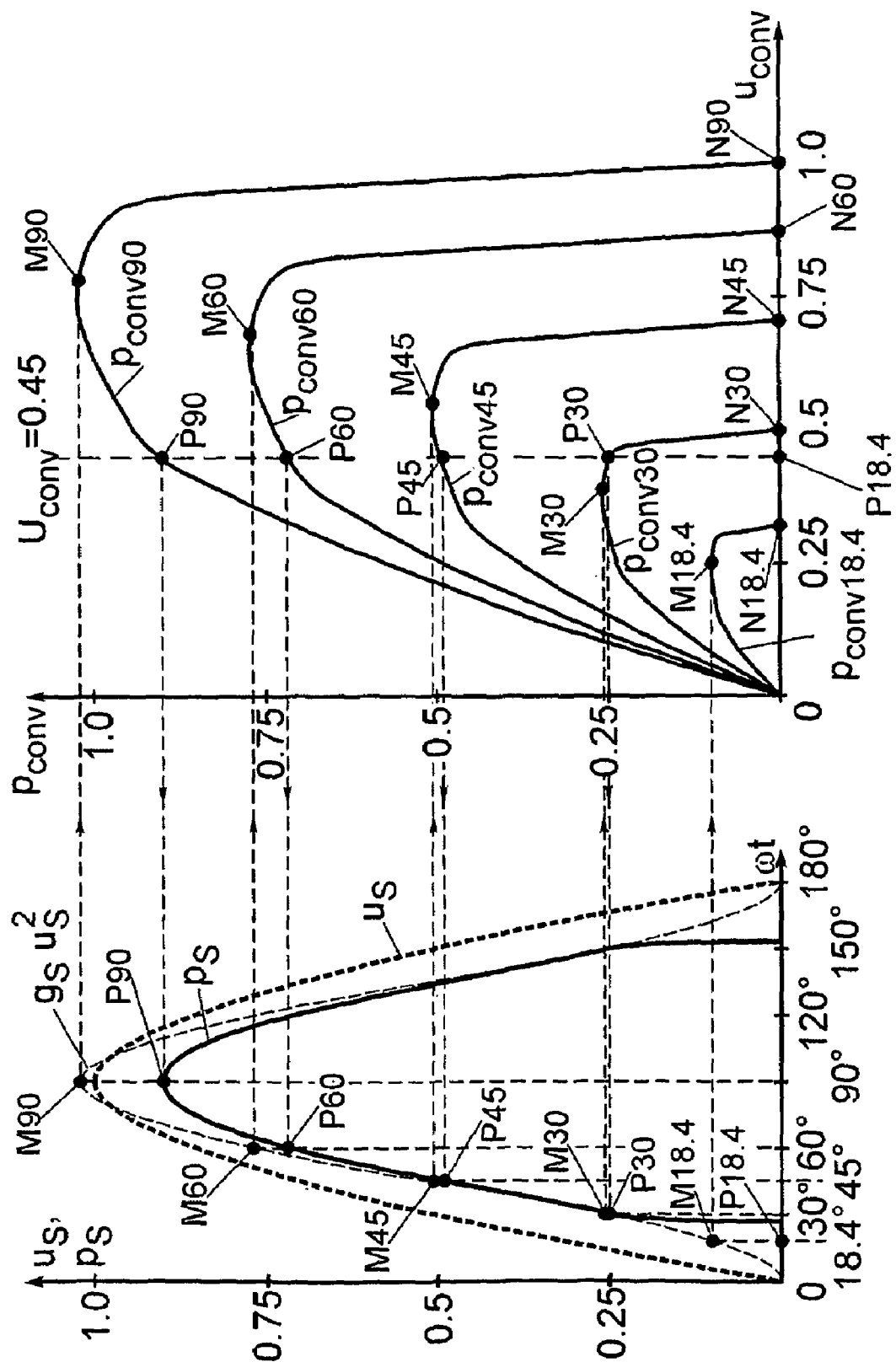
FIG. 4 depicts a graphical representation of the shaping of AC side instantaneous power waveform based on the of interdependency between output voltage and output power of the converter with parallel and series resonance alternation.

These curves, in the FIG. 4, are shown for time instants of 18.4; 30; 45; 60 and 90 electrical degrees. The amplitude of these curves (points M90 to M18.4) changes proportionally to instantaneous value of the mains voltage squared. The power curve ($g_s \cdot u_s^2$) changes in time domain proportionally to instantaneous value of the mains voltage squared as it is shown in the left part of the FIG. 4.

Points M18.4 to M90 are also shown on this curve. The no-load points of the power curves (points N90 to N18.4 in the right part of the FIG. 4) are changing proportionally to instantaneous value of mains voltage.

Figure 11:
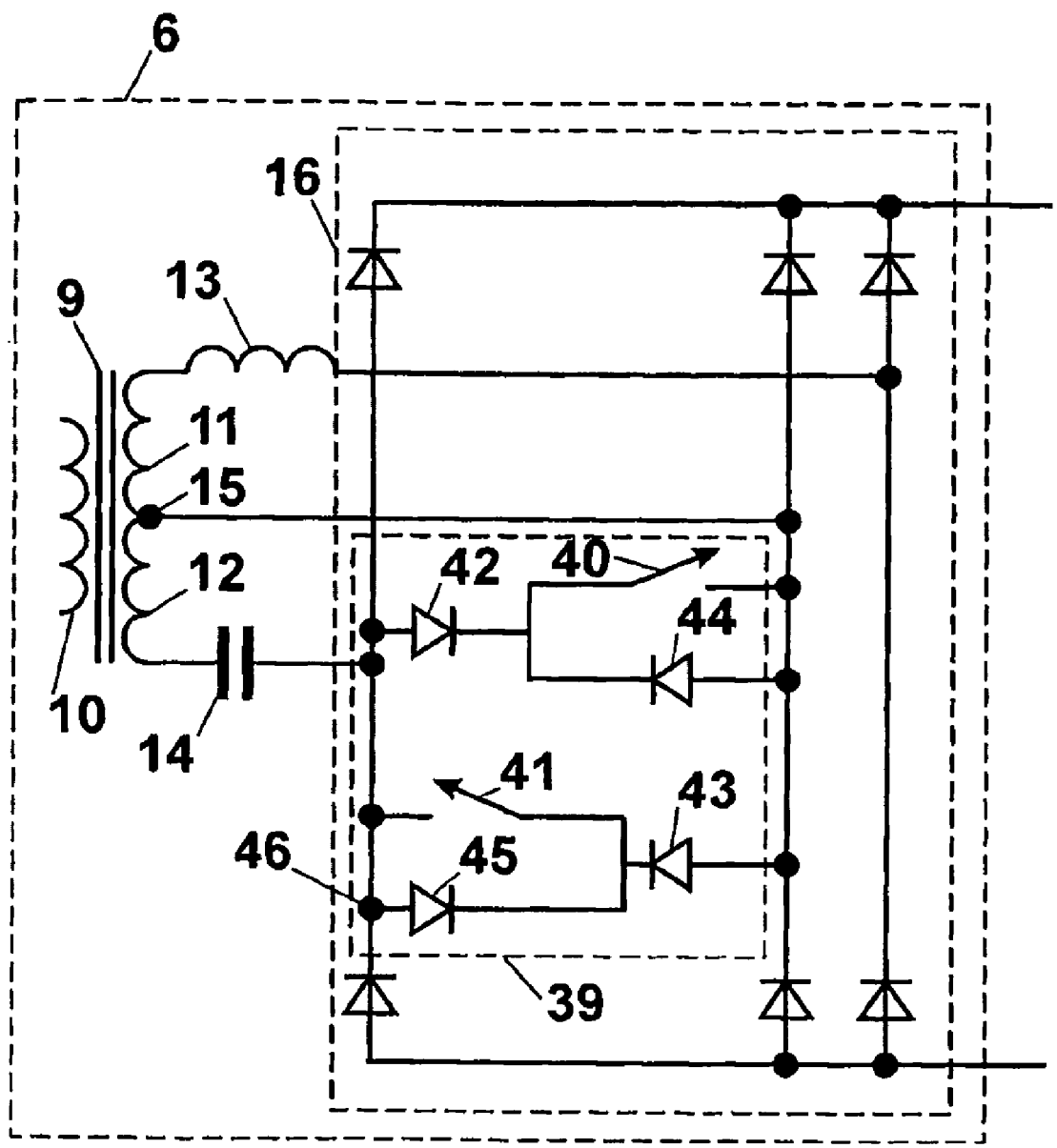
FIG. 11 depicts a circuit diagram of a converter with parallel and series resonance alternation wherein a by-pass circuit is added in a capacitor branch for further improvement of the power factor.

In FIG. 4, the chosen voltage on the capacitor of the smoothing filter 3 is $u_{conv}$=0.45 relative units and where vertical dashed-line is corresponding to this voltage. This dashed-line cuts output power curves $p_{conv90}$ to $p_{conv18.4}$. Resulting intersection points of instantaneous powers P90 to P18.4 define as instantaneous power delivered to smoothing filter so instantaneous power supplied from the mains since losses are ignored in this case. The points of the instantaneous power P90 to P18.4 found in the right part of FIG. 4 are transferred to the left part of the figure where changing in time instantaneous power curve $p_s$ is constructed. The shape of curve $p_s$ is to some degree different from represented shape of the ideal power curve $g_s \cdot u_s^2$. It follows from this that the shape of mains current is also to some degree different from the shape of mains voltage $u_s$ (current curve is not shown in FIG. 4 for clarity) and power factor correction is not perfect. The ground of imperfect correction is that the output power $p_{conv}$ of the converter with parallel and series resonance alternation 6 is not independent of its output voltage $u_{conv}$, but changes to zero at no-load and at short-circuit. Improvement of the correction is basically possible by extending the range of constant power of the converter by forcing into the processes taking place in the converter. We consider it later (FIG. 11).

Figure 5:
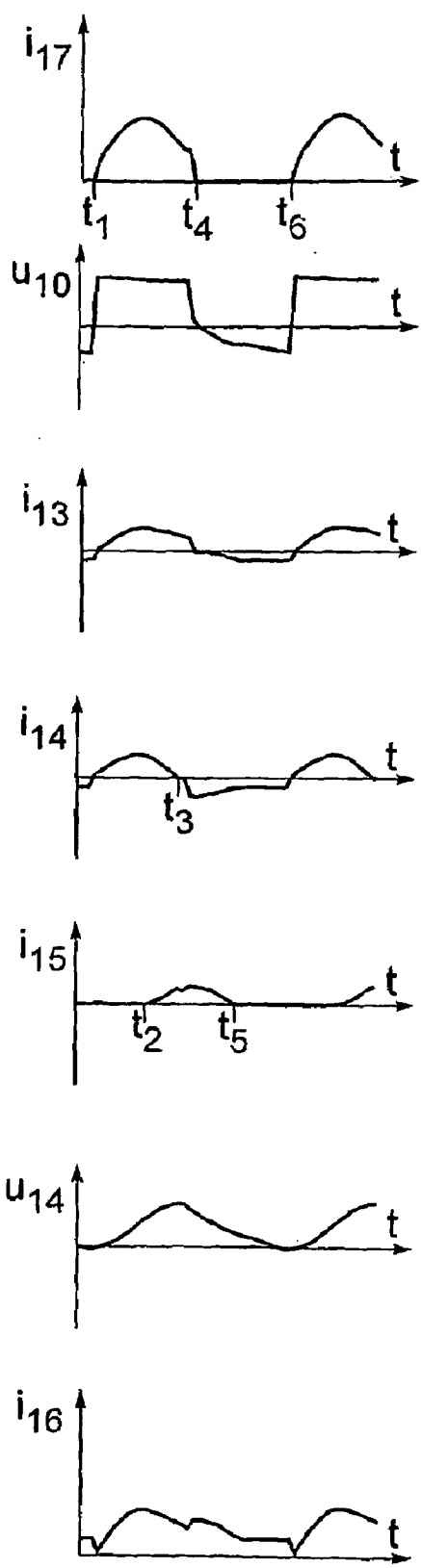
FIG. 5 depicts oscillograms of currents and voltages in power factor correction device when instantaneous value of mains voltage is half of its amplitude value.
Figure 6:
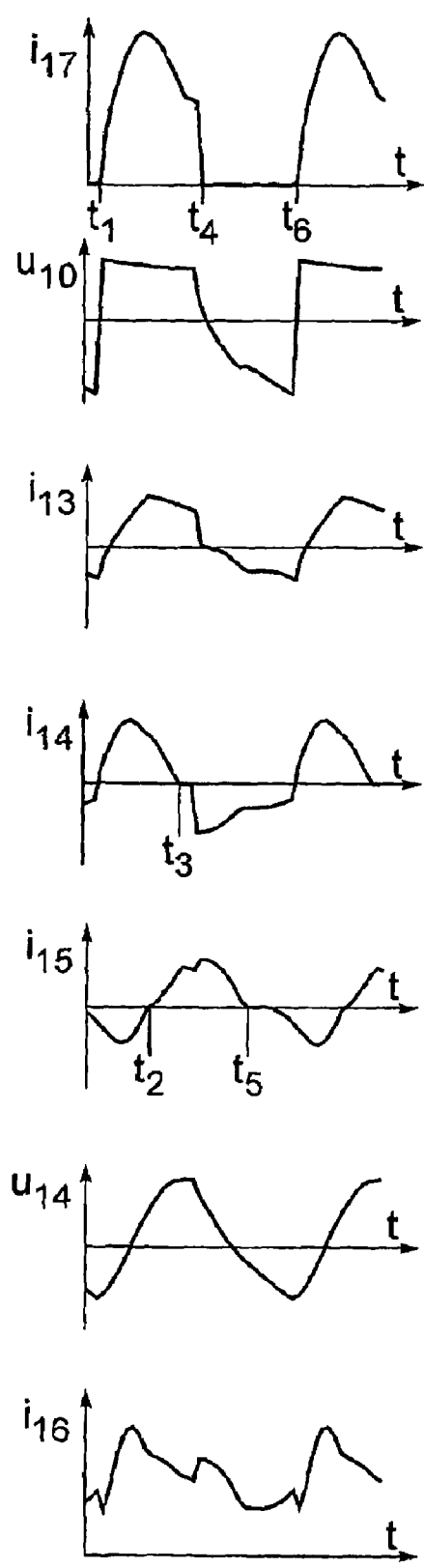
FIG. 6 depicts oscillograms of currents and voltages in power factor correction device when instantaneous value of mains voltage is equal to its amplitude value.

The oscillograms represented in the FIGS. 5 and 6 describe the processes taking place in the converter with parallel and series resonance alternation. There are oscillograms in the FIG. 5 for the case where instantaneous value of mains voltage is half of its amplitude value and in the FIG. 6 for other case where instantaneous value of mains voltage is equal to its amplitude value.

There are shown current $i_{17}$ in switching element 17, current $i_{10}$ in primary winding 10 of the transformer 9, current $i_{13}$ through coil 13, current $i_{15}$ from common connection terminal 15 of the secondary windings of transformer, capacitor current $i_{14}$ and voltage $u_{14}$ and also current $i_{16}$ supplied from the rectifier bridge 16 to smoothing filter.

At first, we review the operation of the converter 6 in case if instantaneous value of the mains voltage is half of its amplitude value that is corresponding to 30 electrical degrees from beginning of the half-cycle (oscillograms in the FIG. 5). At time instant $t_1$, the control circuit 18 turns on-the switching element 17. Current through the switching element 17 and primary winding 10 starts increasing. The negative currents $i_{13}$ and $i_{14}$ in secondary windings 11 and 12 and in coil 13 and capacitor 14 connected in series are decreasing to zero and become then positive. Current $i_{15}$ in the common connection terminal of the secondary windings is equal to zero at that time instant. Secondary windings' currents $i_{13}$ and $i_{14}$ are equal and of the same direction. Thus, converter 6 is in a series resonance operation mode. At the same time capacitor 14 is charging and its voltage $u_{14}$ is increasing. This state is functioning until time instant $t_2$ when current $i_{15}$ appears in common connection terminal of the secondary windings. The current $i_{15}$ appears since the part of the current in secondary winding 11 is delivered directly to the rectifier bridge 16 and this part of the current is not passing through another secondary winding 12. At time instant $t_3$, capacitor current $i_{14}$ changes to zero since capacitor voltage $u_{14}$ has time to increase sufficiently. After that, current from transformer 9 is delivered to rectifier bridge 16 only through the winding 11. Now, because of that, transformer 9 ratio is higher than it was during time period $t_1$ to $t_2$ when windings 11 and 12 were operating in series. Transformer ratio is changing automatically under the influence of circuit voltages and currents. At time instant $t_4$, the control circuit 18 turns off the switching element 17. Currents $i_{17}$ and $i_{13}$ changes to zero and instead of them current $i_{14}$ appears in negative direction that starts discharging of the capacitor 14. The primary winding's voltage $u_{10}$ changes to negative.

Current $i_{15}$ starts decreasing and current $i_{13}$ increases in negative direction. At time instant $t_5$ current $i_{15}$ becomes zero again and currents $i_{13}$ and $i_{14}$ become equal. Hereby, the converter 6 switches again into complete series resonance mode. At time instant $t_6$, control circuit 18 turns on the switching element 17 again and described above cycle is repeating. Currents $i_{13}$, $i_{14}$ and $i_{15}$ are rectified by the rectifier bridge 16 and current $i_{16}$ is obtained on the output of this rectifier bridge.

There are voltage and current oscillograms shown in the FIG. 6 which are corresponding to the case when instantaneous value of mains voltage has increased to its amplitude value and their shapes are not too different from the oscillograms shown in the FIG. 5. Except for the current $i_{15}$ that passes from secondary windings' connection terminal 15 to the rectifier bridge 16. In the FIG. 6, the duration of the current $i_{15}$ during one switching period ($t_1$ to $t_6$) has significantly increased. Current $i_{15}$ appears only when the voltage of one of the secondary windings together with voltage of capacitor 14 or coil 13 exceeds voltage on capacitor 3.1 in the smoothing filter 3. At the time of maximal instantaneous values of the mains voltage this condition is running longer compared to at smaller instantaneous values of the mains voltage. During time interval when instantaneous value of the mains voltage is small, secondary windings 11 and 12 are mainly connected in series and current $i_{15}$ through their connection terminal is small (see $i_{15}$ in the FIG. 5). During time intervals when instantaneous value of the mains voltage is high, current $i_{15}$ increases significantly (see $i_{15}$ in the FIG. 6) and in this case it means increase of the transformer 9 ratio. The keeping of the required, nearly inverse proportional dependence between current supplied from the bridge rectifier 16 to smoothing filter 3 and voltage of smoothing filter is realized by means of automatically changing ratio of the transformer 9 and, along with that, the stabilization of the input impedance of the converter with parallel and series resonance alternation 6 is achieved too.

Using the natural output characteristics of the converter with parallel and series resonance alternation 6 is possible to stabilize the input impedance only at that time intervals when instantaneous value of the mains voltage on both secondary windings is larger than voltage on capacitor 3.1 in smoothing filter 3. In the range of smaller instantaneous values of the mains voltage the input impedance of the converter increases and distortion of the mains current appears, as it was mentioned by describing FIG. 4.

Figure 7:
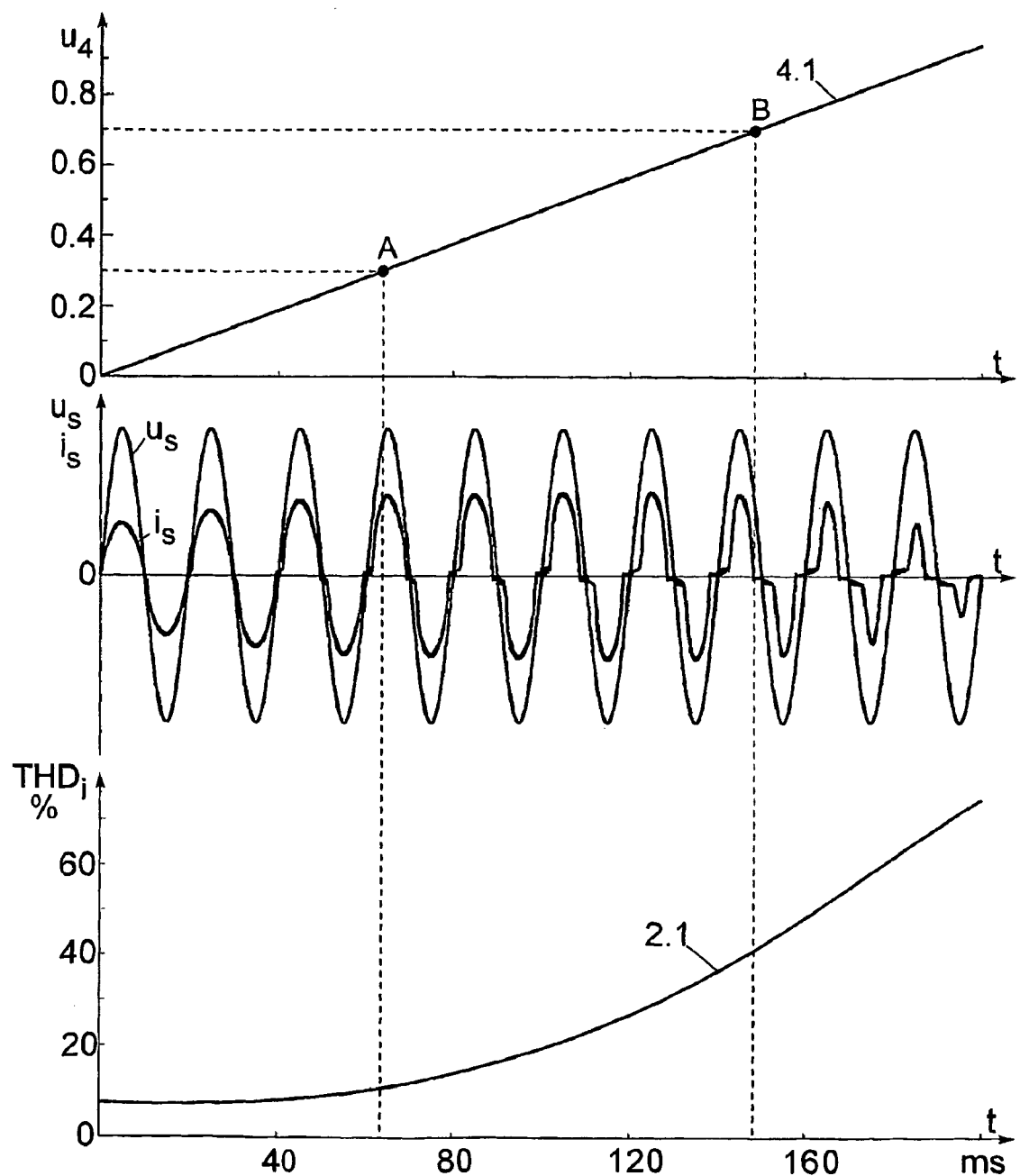
FIG. 7 depicts an oscillogram of the waveform of mains current and curve of mains current distortion coefficient $THD_i$ when load voltage is changing from zero to no-load voltage.
Figure 8:
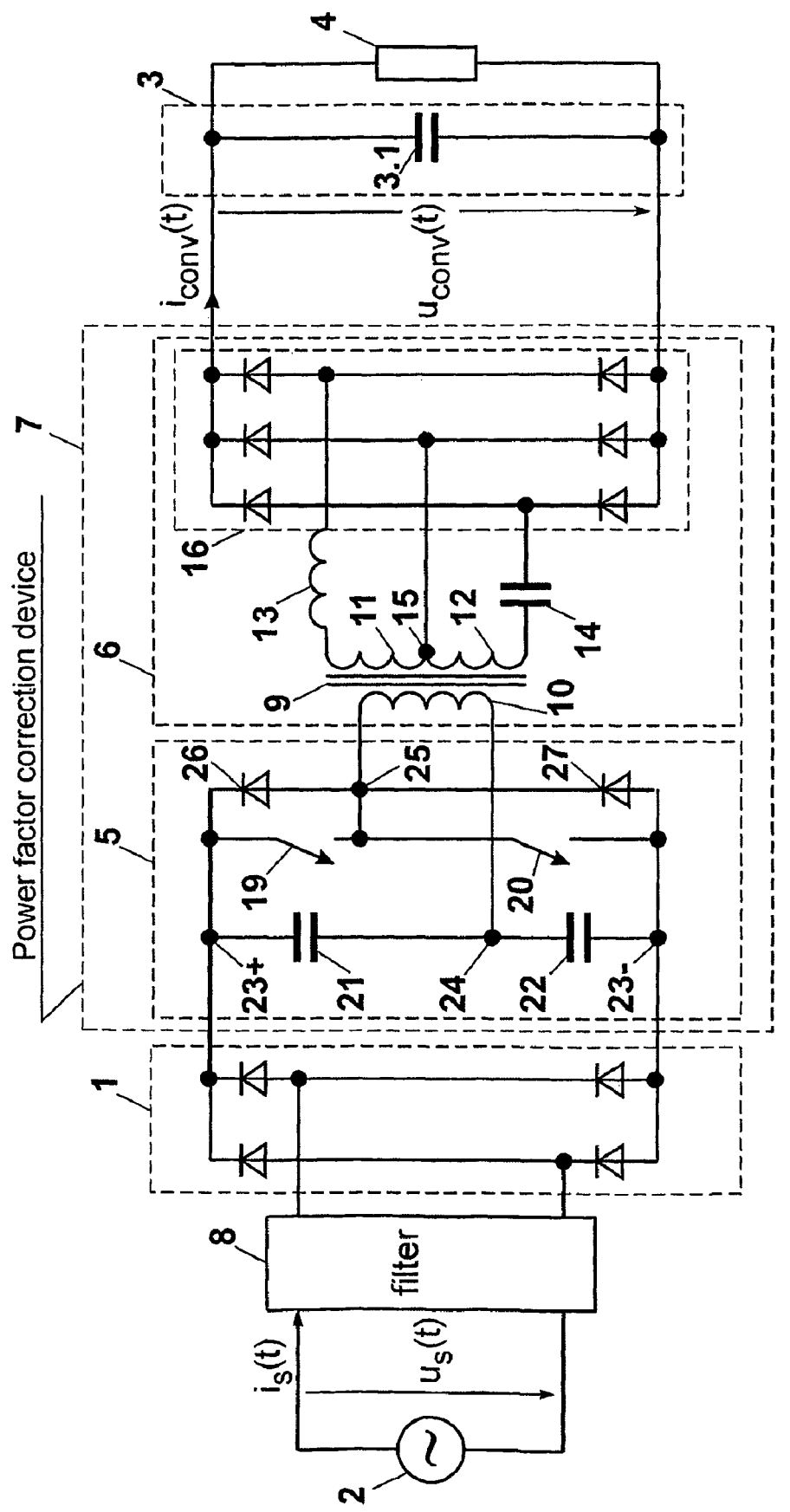
FIG. 8 depicts a second embodiment of an AC/DC converter.

In the FIG. 7, this distortion is shown. As a load 4 the source of back-emf is used, having voltage $u_4$ (curve 4.1 in the FIG. 7) changing from zero to no-load voltage of AC/DC converter (no-load voltage corresponds to 1.0 relative unit in the figure). There are also shown mains voltage oscillogram (curve $u_s$), mains current oscillogram (curve $i_s$) and mains current distortion $THD_i$ (curve 2.1) in the FIG. 7. On the mains current oscillogram (curve $i_s$) it is seen that at higher values of back-emf the mains current appears only when instantaneous value of mains voltage (curve $u_s$) has become sufficiently high. The mains current distortion factor $THD_i$ is the smallest in the range close to short-circuit and increases with back-emf increasing. Thus, it is unpractical to use converter in the range close to no-load. The practical operating range is about 0.3 to 0.7 of no-load voltage that is shown between points A and B in the FIG. 7. The distortion factor $THD_i$ is 10 to 40 per cent in this range. In the interval of the output voltage 0 to 0.3 of no-load voltage (this is a range close to short-circuit), the operation is possible and this is not causing overloads in the converter and distortion of the mains current remains small. But this range is not practical for permanent operation because of the lower power delivered to load 4 and smaller efficiency of the converter. The reducing of the current supplied from the mains, in the range of load close to short-circuit, is caused by converter 6 automatically switching into the parallel resonance mode. In the FIG. 8, there is another modification of AC/DC converter. As a frequency-increasing unit 5 there is used a well-known half-bridge inverter circuit having two switches 19, 20. Capacitors connected in series 21, 22 and switching elements 19, 20 connected in series are inserted in DC diagonal 23+ and 23− of this half-bridge that is supplied from rectifier bridge 1. The connection terminal 24 of the capacitors 21, 22 and connection terminal 25 of the switches 19, 20 forms an AC diagonal of the half-bridge, which is connected to primary winding of the transformer 10. The reverse diodes 26, 27 are connected in parallel with switching elements 19, 20.

Figure 9:
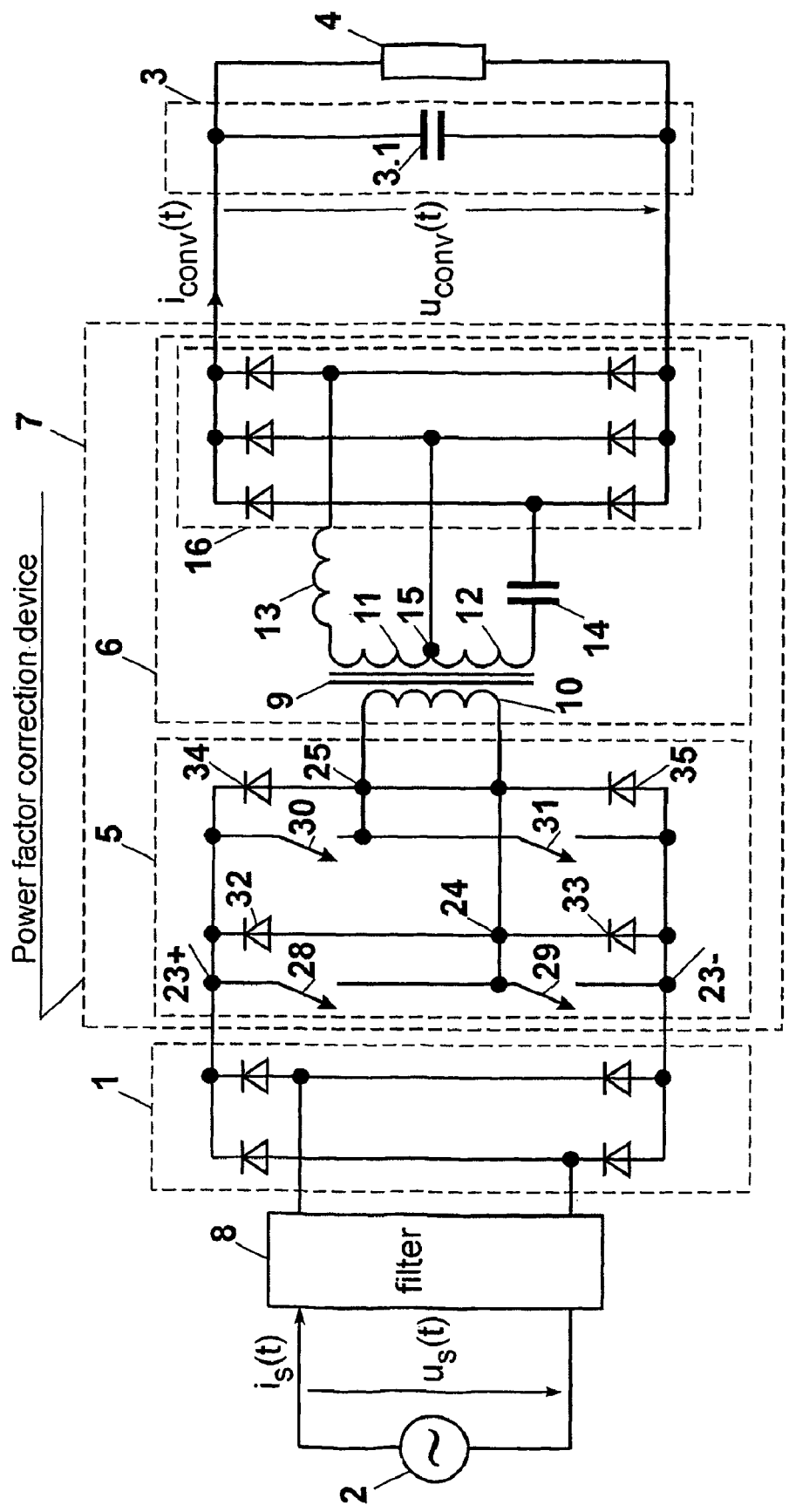
FIG. 9 depicts a third embodiment of an AC/DC converter.

In the FIG. 9, there is represented one more modification of the AC/DC converter having as a frequency-increasing unit 5 a full-bridge inverter circuit. The pairs of the switching elements 28, 29 and 30, 31 are inserted in DC diagonal 23+ and 23− of the full-bridge inverter. The connection terminals 24, 25 of the switching element pairs are forming the AC diagonal of the bridge. The reverse diodes 32, 33, 34, 35 are connected in parallel with switching elements.

Power factor correction in these AC/DC converters where frequency-increasing unit 5 is implemented as an inverter (FIG. 8 and FIG. 9), in principle, is not different from power factor correction in AC/DC converter where frequency-increasing unit 5 is implemented as a chopper (FIG. 3) that is described above. Nevertheless, by using of the inverter circuit, the converter 6 load could be supplied with more power, that is an advantage at higher power levels.

Figure 10:
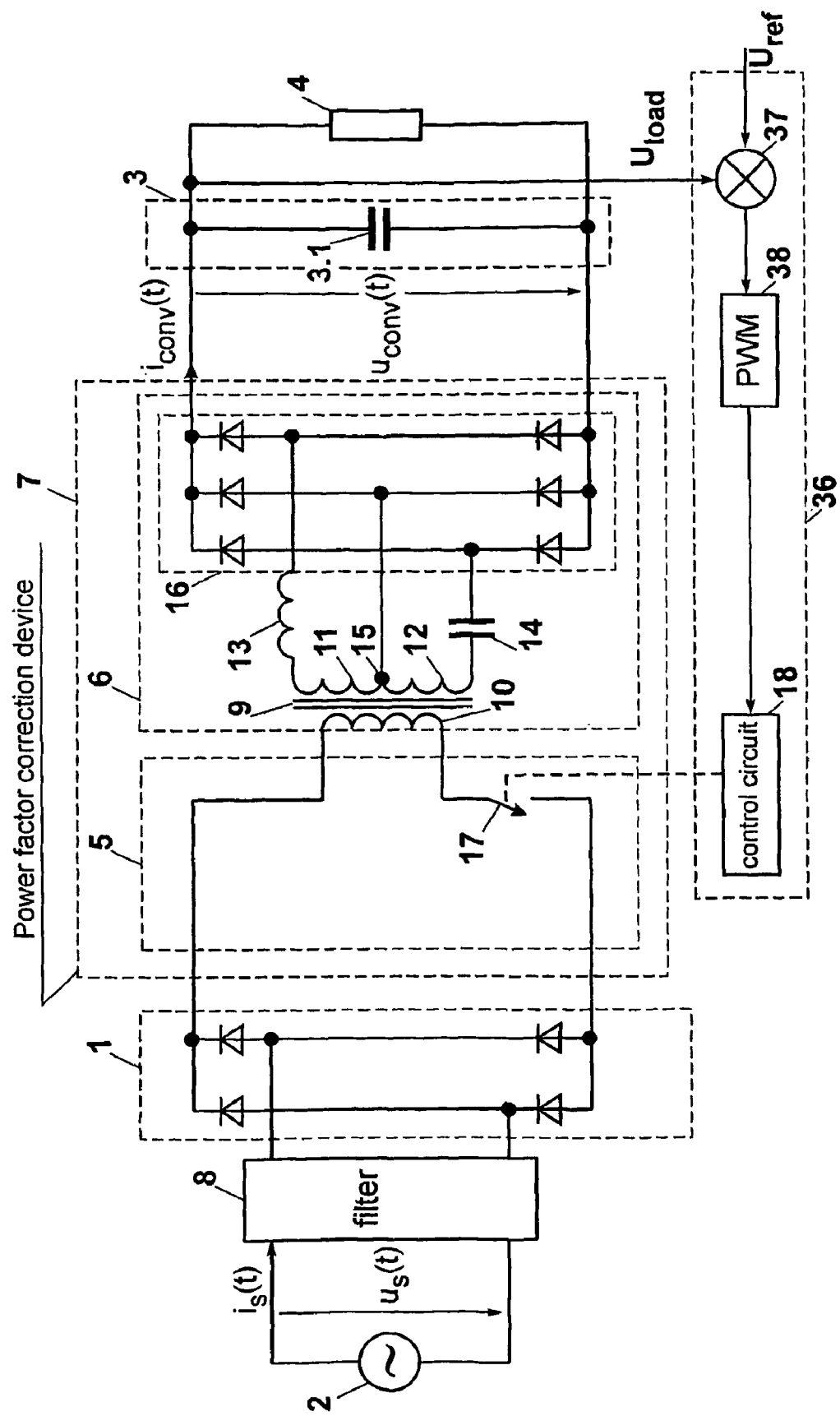
FIG. 10 depicts a circuit diagram of an AC/DC converter having output voltage feedback for stabilization and control of output voltage.

In the FIG. 10, there is another modification of AC/DC converter having a feedback circuit 36 for output voltage stabilization and control. In the feedback circuit there is a comparator unit 37, which controls a pulse width modulator 38 on the difference between real voltage $U_{load}$ and reference voltage $U_{ref}$. In its turn, pulse width modulator 38 transmits the signal to the control unit 18 of the chopper 17.

The stabilization and control of the voltage is achieved by pulse width modulator 38 and through the control circuit 18 by changing the duty cycle of the switching element 17. If for some reason the voltage supplied to load 4 $U_{load}$ is higher than reference voltage $U_{ref}$, so comparator 37 transmits a difference signal to the pulse width regulator 38 and this is resulting in a shorter pulse given by pulse width regulator 38 to the control circuit 18. Hereby, the turn-on state of the switch 17 reduces. As a result an average voltage transmitted to the converter 6 reduces, and hence, decreases output power of the converter. Because of the converter 6 output power reducing, the current $i_{conv}$, supplied from the converter 6 to the smoothing filter 3 decreases and voltage on the smoothing filter capacitor 3.1 starts decreasing. This way, the load voltage $U_{load}$ is adjusted equal to the reference voltage $U_{ref}$.

In the FIG. 11, there is shown a modification of the converter with parallel and series resonance alternation 6 that comprises a current by-pass circuit 39 in the capacitive branch (which is formed by secondary winding 12 and capacitor 14). The current by-pass circuit includes reverse switching elements connected in parallel 40, 41, voltage limiting reverse diodes 42, 43 connected in series with switching elements and current limiting reverse diodes 44, 45 connected in parallel with switching elements. The current by-pass circuit is connected between transformer secondary windings' connection terminal 15 and connection terminal 46, which is, in its turn, between the capacitor 14 and input 16 of the rectifier bridge.

Current by-pass circuit 39 is used here to extend the range of inversely proportional dependence between output voltage and current of the converter 6 in case if further improvement of the power factor correction is needed. Switching elements 40 or 41 in the current by-pass circuit are switched on during low instantaneous values of mains voltage when current is not appearing otherwise. Switching elements 40 (or 41 during another polarity of half-cycle) are turning on every cycle of switching frequency voltage, where turn-on time is delayed by 0 to 70 electrical degrees with respect to the beginning of the half-cycle. The on-state of the switching element 40 (41) continues until current through the by-pass circuit becomes zero in natural way. By means of by-pass circuit 39, capacitor 14 is charging to the voltage, which exceeds the voltage on secondary winding 12 because of the transformer 9 leakage inductance. In the next half-cycle, the voltage on the capacitor 14 is added to the voltages on secondary windings 11, 12, and as a result current is supplying through the rectifier bridge 16 to the smoothing filter 3—that was the purpose. The value of current transmitted to the rectifier bridge is controlled by biasing the turn-on time of the switching elements 40, 41 with respect to the start point of the switching voltage half-cycle.

Figure 12:
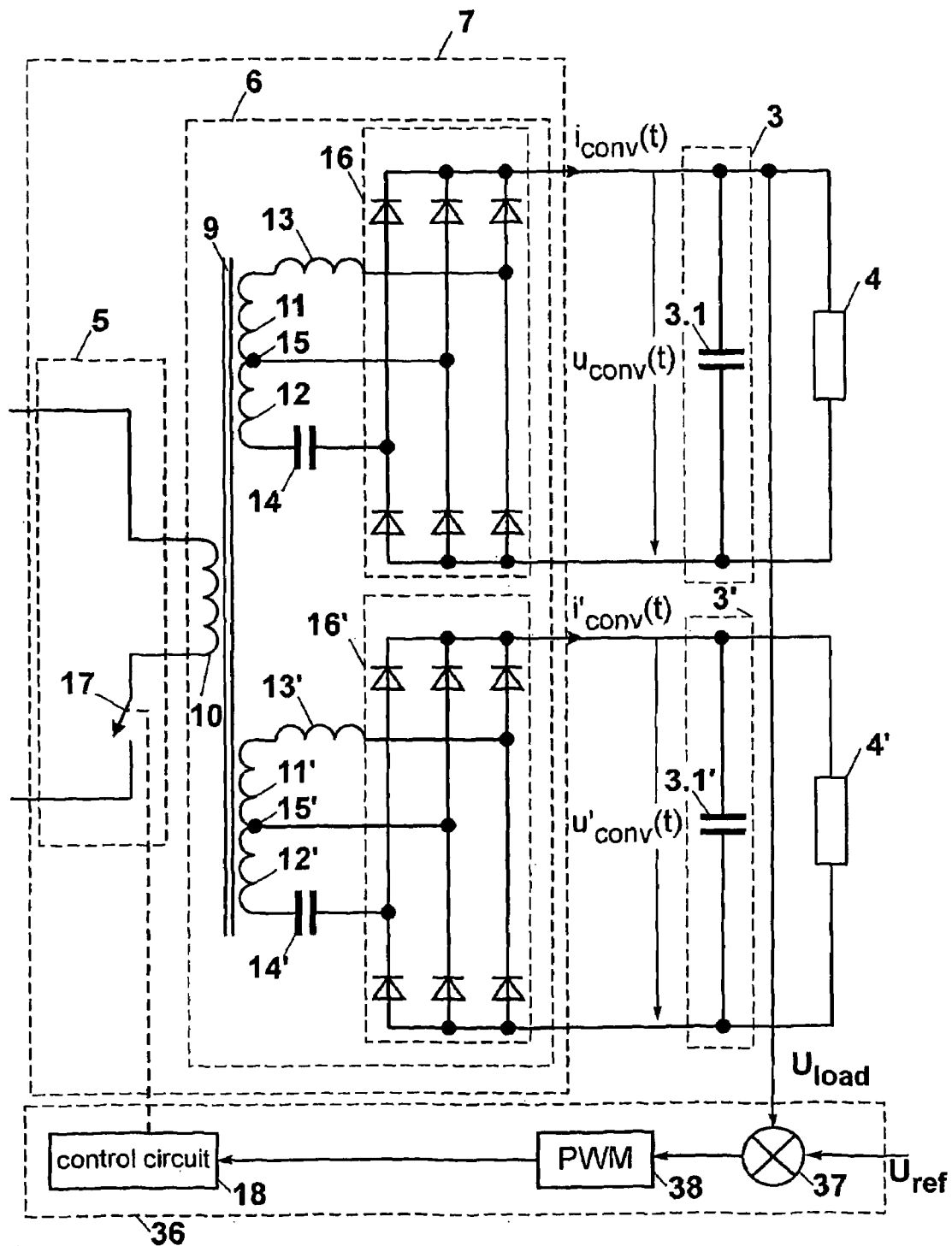
FIG. 12 depicts a circuit of a power factor correction device that enables connection of two galvanically separated loads.

In the FIG. 12, there is represented a power factor correction device 7 having two galvanically separated loads 4 and 4'. The both loads are supplied through transformer 9. This transformer has two pairs of the secondary windings 11, 12 and 11', 12' which are galvanically separated. Voltage is supplied from the secondary winding pairs 11, 12 and 11', 12' through the corresponding coils 13 or 13' and capacitors 14 or 14' to the rectifier bridges 16 or 16'. Each output of the rectifier bridge (16 and 16') is connected to the corresponding own smoothing filter 3 or 3' which, for their turn, are connected to the corresponding loads 4 or 4'. To stabilize the voltage on load 4, the feedback circuit 36, which transmits a control signal for switching element 17 in the frequency increasing unit 5, is used. The load 4 voltage is transmitted to the comparator unit 37 of feedback circuit 36.

By changing the reference voltage $U_{ref}$ voltages on loads 4 and 4' are changing together. This way, the only voltage of load 4 is stabilized. On the load 4', there is some voltage difference compared to the reference voltage $U_{ref}$ and this difference is depending on the mains voltage and currents in the loads 4 and 4'.

Figure 13:
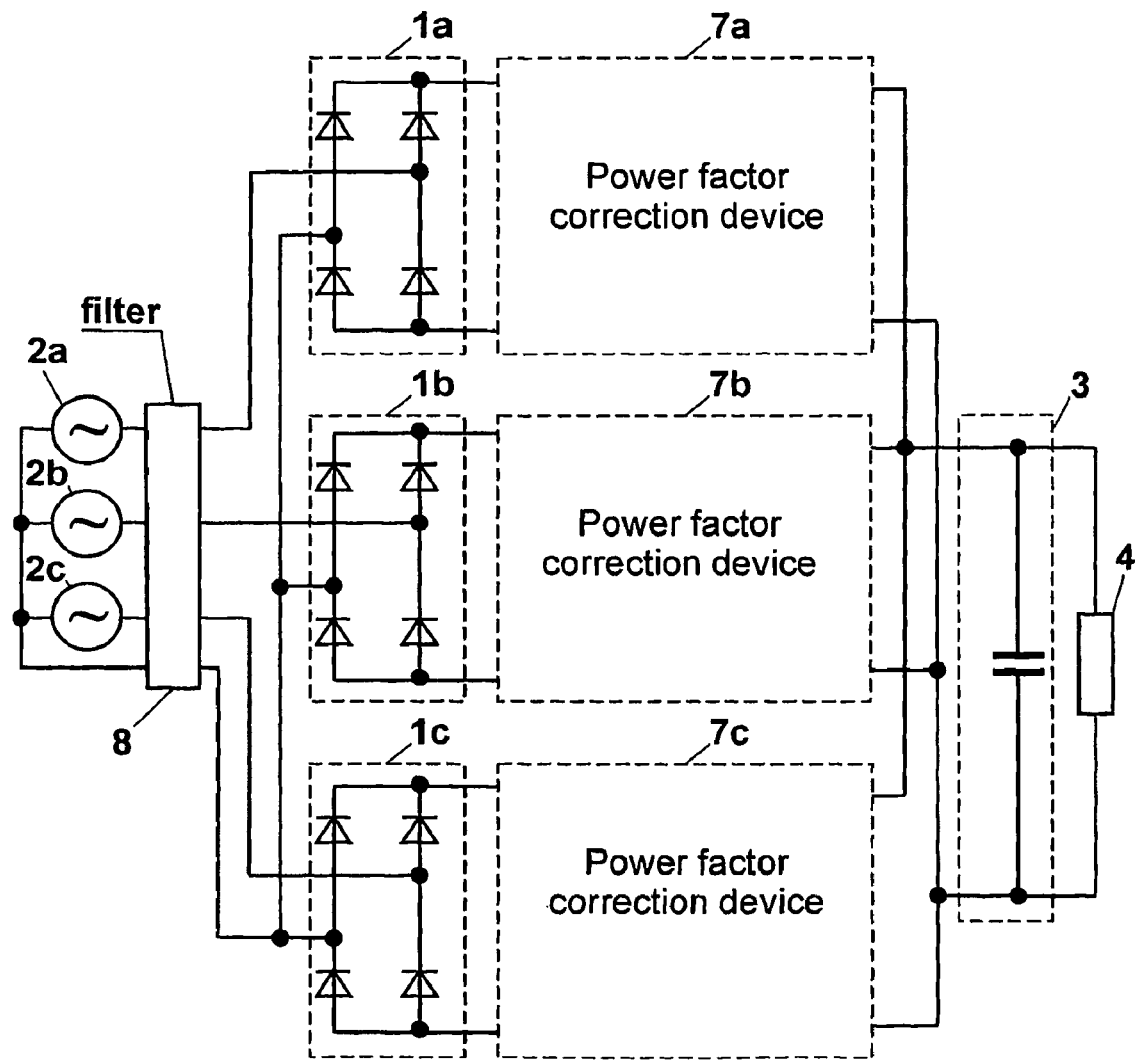
FIG. 13 depicts a circuit of a three-phase AC/DC converter with appropriate power factor correction device.

In the FIG. 13, there is represented a three-phase AC/DC converter where single-phase voltage sources 2a, 2b and 2c are connected in star. In every phase there is its own rectifier bridge (correspondingly 1a, 1b, 1c), which is supplied by phase voltage. Every rectifier bridge is connected to its own power factor correction device (correspondingly 7a, 7b, 7c). The outputs of the power factor correction devices are connected in parallel and supply one smoothing filter 3 which is further connected to the load 4.

The rectifier bridges 1a, 1b and 1c could be also connected in delta. In this way, third current harmonic are eliminated, that is advantageous. But at the same time the operating voltage of the correction devices 7a, 7b and 7c increases that could be not so advantageous.

The invention claimed is:

1. AC/DC converter, comprising:
   a rectifier having mains alternating voltage at its input terminals;
   a smoothing filter having an output connected to a load;
   a power factor correction device connected between an output of the rectifier and an input of the smoothing filter, wherein the power factor correction device comprises, connected in series, a frequency-increasing unit and a converter with parallel and series resonance alternation, the converter comprising a transformer with a primary winding and at least two secondary windings connected in series, wherein a coil is connected in series with one of the secondary windings and a capacitor is connected in series with another secondary winding, and a three-phase rectifier bridge, having a first input terminal connected to the coil, a second input, connected to a common point of the secondary windings and a third input, connected to the capacitor, wherein the converter with parallel and series resonance alternation comprises a controlled current by-pass circuit in capacitor branch which is connected to the common point of the secondary windings and to a point between the capacitor and the three-phase rectifier bridge.

2. As in claim 1, wherein a chopper is used as the frequency-increasing unit.

3. As in claim 2, wherein a pulse width of the frequency-increasing unit is controllable.

4. As in claim 2, wherein the AC/DC converter comprises a feedback circuit for voltage stabilization which decreases relative duration of voltage pulses in the frequency-increasing unit in case of increasing of the output voltage of the AC/DC converter.

5. As in claim 2, wherein the transformer comprises at least one additional pair of secondary windings wherein a first winding of the additional pair is connected in series to its own coil and a second winding of the additional pair is connected in series to its own capacitor and a three-phase rectifier bridge belonging to the additional pair of secondary windings having a first input connected to the coil, a second input to a common point of the additional pair of secondary windings and a third input to the capacitor and an output of the rectifier bridge is connected to an additional smoothing filter which is supplying an additional load.

6. As in claim 1, wherein an inverter is used as the frequency-increasing unit.

7. As in claim 6, wherein a pulse width of the frequency-increasing unit is controllable.

8. As in claim 6, wherein the AC/DC converter comprises a feedback circuit for voltage stabilization which decreases relative duration of voltage pulses in the frequency-increasing unit in case of increasing of the output voltage of the AC/DC converter.

9. As in claim 6, wherein the transformer comprises at least one additional pair of secondary windings wherein a first winding of the additional pair is connected in series to its own coil and a second winding of the additional pair is connected in series to its own capacitor and a three-phase rectifier bridge belonging to the additional pair of secondary windings having a first input connected to the coil, a second input to a common point of the additional pair of secondary windings and a third input to the capacitor and an output of the rectifier bridge is connected to an additional smoothing filter which is supplying an additional load.

10. As in claim 1, wherein the AC/DC converter comprises a feedback circuit for voltage stabilization which decreases relative duration of voltage pulses in the frequency-increasing unit in case of increasing of the output voltage of the AC/DC converter.

11. As in claim 1, wherein the transformer comprises at least one additional pair of secondary windings wherein a first winding of the additional pair is connected in series to its own coil and a second winding of the additional pair is connected in series to its own capacitor and a three-phase rectifier bridge belonging to the additional pair of secondary windings having a first input connected to the coil, a second input to a common point of the additional pair of secondary windings and a third input to the capacitor and an output of the rectifier bridge is connected to an additional smoothing filter which is supplying an additional load.

12. A method for improving a power factor in an AC/DC converter, the method comprising:
rectifying an alternating mains voltage into unidirectional unsmoothed half-waves;
transforming the unidirectional unsmoothed half-waves into high frequency voltage; and
inputting the high frequency voltage to a power factor correction circuit with predetermined input impedance; and
stabilizing the input impedance, by keeping an inversely proportional dependence between an instantaneous value of a current given to an input of a DC-voltage smoothing filter and an instantaneous value of an input voltage of the DC-voltage smoothing filter.

13. As in claim 12, wherein the power factor correction circuit comprises passive components to keep the inversely proportional dependence between the instantaneous value of the current and the instantaneous value of the voltage, and correcting the power factor occurs passively.

14. As in claim 13, wherein the power factor correction circuit comprises controlled circuit components for improving the power factor correction by extending the range of inversely proportional dependence between the instantaneous value of the voltage and the instantaneous value of the current.

15. As in claim 12, wherein the power factor correction circuit comprises controlled circuit components for improving the power factor correction by extending the range of inversely proportional dependence between the instantaneous value of the voltage and the instantaneous value of the current.

* * * * *